(12) United States Patent
DiBuduo

(10) Patent No.: US 6,999,778 B2
(45) Date of Patent: Feb. 14, 2006

(54) MULTIPATH ASSISTANCE FOR PILOT PHASE MEASUREMENT PROCESSES

(75) Inventor: Marcus DiBuduo, Oceanside, CA (US)

(73) Assignee: Denso Corporation, Kariya (JP)

( * ) Notice: Subject to any disclaimer, the term of this patent is extended or adjusted under 35 U.S.C. 154(b) by 446 days.

(21) Appl. No.: 10/188,565

(22) Filed: Jul. 3, 2002

(65) Prior Publication Data

US 2004/0203864 A1 Oct. 14, 2004

(51) Int. Cl.
*H04B 1/10* (2006.01)
(52) U.S. Cl. ............... 455/456.1; 455/67.11; 455/12.1; 455/423; 455/65; 342/357.06
(58) Field of Classification Search ............ 455/456.1, 455/12.1, 456.6, 427, 67.11, 423, 424, 65; 342/357.06
See application file for complete search history.

(56) References Cited

U.S. PATENT DOCUMENTS

2002/0077125 A1 * 6/2002 Hunzinger ................ 455/456
2003/0054835 A1 * 3/2003 Gutowski et al. .......... 455/456
2003/0125046 A1 * 7/2003 Riley et al. ................ 455/456
2003/0215035 A1 * 11/2003 Amerga et al. ............. 375/346
2004/0002344 A1 * 1/2004 Moeglein et al. ........ 455/456.1
2004/0203853 A1 * 10/2004 Sheynblat ................ 455/456.1

* cited by examiner

*Primary Examiner*—Edan Orgad
*Assistant Examiner*—Alan T. Gantt
(74) *Attorney, Agent, or Firm*—Morrison & Foerster LLP

(57) ABSTRACT

A method for enhancing the accuracy of Advanced Forward Link Trilateration (AFLT) position location calculations is disclosed. A position determination entity (PDE) constructs a statistical database of pilot phase measurements reported by mobile stations (MSs) located in a geographic region about a reference base station (BS). When a MS's location is to be calculated, the MS reports a set of PN phase offsets to the PDE. Using only that set of PN phase offsets, the PDE determines a rough estimate of the MS's location using conventional AFLT and also determines the region within which the MS is located. If the PDE determines that the MS did not report one or more earlier arriving PN phase offsets but reported a delayed multipath component, the PDE sends a message to the MS to look for an earlier arriving PN phase offset at a certain time prior to the reported PN phase offset.

37 Claims, 11 Drawing Sheets

(MS Implementation)

MULTIPATH ASSISTANCE FOR PILOT PHASE MEASUREMENT PROCESSES

BACKGROUND OF THE INVENTION

1. Field of the Invention

The present invention relates, generally, to communication network management and, in one embodiment, to a method and apparatus for providing a mobile station with statistics about local multipath conditions to enhance the accuracy of Advanced Forward Link Trilateration position location calculations by removing errors due to multipath uncertainty.

2. Description of Related Art

Introduction

Cellular communication networks are rapidly becoming a primary infrastructure for enabling communication in today's society. As demand for cellular communications has increased, cellular communication networks have become increasingly prevalent and are now providing coverage over larger areas for an ever-expanding variety of services.

For example, in addition to providing a means for typical voice communications such as personal or business telephone calls, cellular communication networks are now being called upon to play a vital role in providing emergency (E-911) communications. The Federal Communications Commission (FCC) has recently imposed E-911 requirements on mobile communications devices, requiring them to provide position determination capability to enable emergency service providers to locate persons in need of emergency assistance. A position determination protocol is fully described by TIA/EIA/IS-801, Revision 1, published by the TELECOMMUNICATIONS INDUSTRY ASSOCIATION (TIA), Standards & Technology Department, 2500 Wilson Blvd., Arlington, Va. 22201, on Mar. 1, 2001 and is herein incorporated by reference.

In addition to E-911 functionality, cellular communication networks are now being used to provide telematics functionality for vehicles equipped with telematics control units (TCUs). As with cellular telephones, these TCUs communicate with base stations/sectors in a cellular communication network to provide telematics functionality for the vehicles, which may include, but is not limited to, vehicle tracking and positioning, on-line navigation, emergency "roadside" assistance, tracking stolen vehicles, automatic emergency transmissions when an accident has occurred, traffic reports, and the like. This telematics functionality is typically provided by a service provider center connected to the TCU through the cellular communication network. As with cellular telephones, these TCUs require position determination capability to implement certain telematics functions.

Cellular Communication Networks

FIG. 1 illustrates an example of a mobile communications device 10 (which includes, but is not limited to, cellular telephones and TCUs, and shall be generally identified herein as a mobile station (MS)) capable of maintaining a connection 30 with a cellular communication network 22 as the MS 10 roves through a geographic area served by the cellular communication network 22, or remains stationary at some geographic location within the network 22. It should be understood that a connection, as referred to herein, includes, but is not limited to, voice, multimedia video or audio streaming, packet switched data and circuit switched data connections, short message sequences or data bursts, and paging. The cellular communication network 22 includes a first base station (BS) 12 communicating over sectors 14, 16 and 42, and a second BS 18 communicating over sectors 20, 44 and 46. A BS is typically comprised of multiple sectors, usually three. Under this configuration, each BS includes a separate transceiver for each sector. Therefore, because a BS's RF transmission pattern can be omni-directional or sectorized, it should be understood that the terms BS and sector may be used interchangeably herein (i.e. the term BS may represent a single sector corresponding to a single transceiver within a cell). The BSs are connected to network infrastructure entities including BS controllers (BSC) 24 that may control a cell cluster 26, and communicate with a mobile switching center (MSC) 28. The BSs and network infrastructure entities contain transceivers, modems, processors, memory and the like, well understood by those skilled in the art, for controlling the cellular communications between the MS 10 and the network 22.

As illustrated in the example of FIG. 2, the MS 10 may include a processor 48, memory 50, antenna 52, transceiver 54, modem 56, and a telephone interface 58 for controlling telephone functions. The transceiver 54 may be configured to be compatible with one of more of the following communication protocols: GSM, CDMA, AMPS, TDMA, FDMA, and the like. A CDMA wireless communication system is fully described by TIA/EIA/IS-2000, Volumes 1–5, Release A, published by the TELECOMMUNICATIONS INDUSTRY ASSOCIATION (TIA), Standards & Technology Department, 2500 Wilson Blvd., Arlington, Va. 22201, on Mar. 1, 2000 and all of which is herein incorporated by reference. Although the processor 48 and memory 50 are shown in FIG. 2 in separate blocks, it should be understood that references to MSs herein generally include different types of configurations for processors, memory and other peripheral devices not shown in FIG. 2 but well understood by those skilled in the art.

Cellular Communication Links

FIG. 3 illustrates an exemplary communication link 30 between a MS 10 and a BS 12. Communications from the BS 12 to the MS 10 are called the forward link, and communications from the MS 10 to the BS 12 are called the reverse link. The forward and reverse links utilize a number of forward and reverse channels. For example, the BS 12 communicates with the MSs using a plurality of forward common channels or links which may include, but are not limited to, one or more pilot channels, a sync channel, and one or more paging channels, discussed in greater detail below. These channels are referred to as common channels because the BS 12 may communicate those channels to all MSs in the network. Generally, these common channels are not used to carry user specific data, but are used to broadcast and deliver common information.

Each sector within BS 12 broadcasts a pilot channel that identifies that sector and is simple for a MS 10 to decode. Pilot channels are distinguished by pseudo-noise (PN) offsets. Because the pilot channel identifies a sector, it is common to refer to the sector by the pilot channel's PN offset number, commonly referred to as the PN offset. The pilot channel implicitly provides timing information to the MS, and is also used for coherent demodulation, but it otherwise typically does not contain any data. When a MS is first powered up, it begins searching for a pilot channel. When a MS acquires (is able to demodulate) a pilot channel, the timing information implicit in the pilot channel allows the MS to quickly and easily demodulate the corresponding sync channel being transmitted by the transceiver.

Because the sync channel contains more detailed timing information, once the MS acquires the sync channel, the MS is then able to acquire a paging channel being transmitted by the same BS that is transmitting the pilot channel. When the MS synchronizes its timing with that of a BS, the associated pilot channel is considered to be the reference pilot, since all timing operations are referenced with respect to receipt of this signal. Additionally, that BS is known as the active BS. When a cellular network is attempting to initiate communications with a MS through a particular BS, a "page" is transmitted to that MS on the paging channel of that BS, and the network may also send the "page" on the paging channel of neighboring BSs. Thus, once the MS is able to demodulate the paging channel of a particular BS, the MS may then monitor that paging channel while the MS is idle and waiting for incoming connections or an incoming message. In general, each BS may utilize one pilot channel, one sync channel and one paging channel that are common for all MSs to receive. However, because there are practical limitations on the number of MSs that can be simultaneously paged using one paging channel, some BSs may employ multiple paging channels.

In addition to the forward common channels described above, the BS 12 communicates with individual MSs using a plurality of forward dedicated channels or links which may include, but are not limited to, multiple traffic channels, multiple supplemental channels, and multiple access channels and control channels. These channels are referred to as dedicated channels because the BS communicates the channels to specific MSs 10, and the channels may carry data specific to a MS.

The reverse channels or links may include an access channel and one or more reverse traffic channels, supplemental channels, and control channels. After a MS receives an incoming page from a BS, the MS will initiate a connection setup using, in part, an access channel.

As illustrated in FIG. 4, a channel 32 may be broken up into superframes or slots 60, typically of 80-millisecond duration. Each slot may be divided into three phases 62. These phases are numbered 0, 1 and 2 in FIG. 4. Coincident with the timing of the phases are four frames 34. These four frames are aligned with the three phases at the superframe boundaries. Each frame 34 is therefore typically 20 milliseconds long. Other frame sizes such as 5 ms, 10 ms and multiples of 20 ms can also be used. A message is typically comprised of one or more frames.

Within a superframe, preambles of various lengths can be transmitted prior to transmission of the frames, for example, in the case of reverse access channels and reverse common control channels. It should be understood that the content of the frames 34 can differ. One frame may contain a header 36, signaling 38 and data 40 multiplexed on different code channels, another may contain only signaling, and yet another may contain only data.

Position Determination Using AFLT

FIG. 5 is an exemplary diagram of a network of three BSs A, B and C transmitting pilot signals PNA, PNB and PNC that can be received by a MS 10. Propagation delays $t_{PD}$PNA, $t_{PD}$PNB, and $t_{PD}$PNC are associated with the transmission of the pilot signals from the BSs to the MS, and are a function of the distance between the BSs and the MS, among other things. The transmitted pilot signal for each BS consists of the same pseudo-random bit sequence (also known as pseudo-noise (PN)), which is delayed in time by a defined and pre-determined amount for each BS. Each BS in a network transmits a pilot signal having a different timing than that of other BSs in the general area so that the source of a particular pilot signal can be identified by determining the timing delay of the pilot signal.

FIG. 6 is an exemplary timing diagram illustrating the timing of the pilot signals (designated as $PNA_T$, $PNB_T$ and $PNC_T$) as they are transmitted from the BSs of FIG. 5. In the example of FIG. 6, the initial known and fixed PN timing delays for BS A, BS B and BS C with respect to a common timing marker 65 are $tPNA_T$, $tPNB_T$ and $tPNC_T$, respectively. If the communication system is using Code Division Multiple Access (CDMA) technology and adhering to the IS-2000-A standard (wherein the PN code rate is 1.228800 MHz), then mathematically:

$$tPNA_T = A*64/1228800 \text{ (in seconds)},$$

$$tPNB_T = B*64/1228800 \text{ (in seconds), and}$$

$$tPNC_T = C*64/1228800 \text{ (in seconds)},$$

where A, B and C are values representative of a relative magnitude of each PN timing delay, and the value of sixty-four corresponds to the minimum time separation between individual PN transmissions.

The common timing marker is usually a timing signal derived from a Global Positioning System (GPS) receiver. All of the BSs are synchronized to each other using the common timing marker 65 distributed throughout the network, so that when the BSs transmit their PN, the only timing difference between them is due to the known PN timing delay for each BS.

FIG. 6 also shows the same three pilot signals as they are received by the MS of FIG. 5 (designated as $PNA_R$, $PNB_R$ and $PNC_R$). These pilot signals will be received at the MS with respect to the common timing marker 65 with timing delays of $tPNA_R$, $tPNB_R$ and $tPNC_R$, respectively, which are different from those at the time of transmission due to propagation delays $t_{PD}$PNA, $t_{PD}$PNB, and $t_{PD}$PNC that are largely dependent on the distance that the pilot signal had to travel to reach the MS. Thus, in simplest derivation, $$tPNA_R = tPNA_T + t_{PD}PNA,$$

$$tPNB_R = tPNB_T + t_{PD}PNB, \text{ and}$$

$$tPNC_R = tPNC_T + t_{PD}PNC.$$

Because the MS 10 is not synchronized with the common timing marker 65, the MS can only observe the timing of the received pilot signals with respect to the received signal of the reference pilot. For example, if the MS 10 uses $PNA_R$ as a reference signal, then MS 10 can measure the pseudo-noise sequence timing difference of $PNB_R$ and $PNC_R$ with respect to the pseudo-noise sequence timing of $PNA_R$. Given these measurements, the MS can also determine the timing difference of $PNC_R$ with respect to $PNB_R$. These timing differences $tBA_R$, $tCA_R$, and $tCB_R$ are identified in FIG. 6, where:

$$tBA_R = tPNB_R - tPNA_R = (t_{PD}PNB - t_{PD}PNA) + K_{BA},$$

$$tCA_R = tPNC_R - tPNA_R = (t_{PD}PNC - t_{PD}PNA) + K_{CA}, \text{ and}$$

$$tCB_R = tPNC_R - tPNB_R = (t_{PD}PNC - t_{PD}PNB) + K_{CB},$$

where:

$$K_{BA} = tPNB_T - tPNA_T,$$

$$K_{CA} = tPNC_T - tPNA_T, \text{ and}$$

$$K_{CB} = tPNC_T - tPNB_T.$$

Since $K_{BA}$, $K_{CA}$, and $K_{CB}$, which are identified in FIG. 6, are the known transmission timing differences of the respective pilot signals with respect to the common timing marker, they are commonly neglected when discussing the relative timing of pilot signals. Instead, it is more appropriate to discuss the time offset in the PN phase caused by the difference in propagation delays, this value herein identified as the PN phase offset. For example, the PN phase offset of $PNB_R$ and $PNC_R$, with respect to $PNA_R$ is given by:

$$t_{PH}BA_R = tBA_R - K_{BA} = t_{PD}PNB - t_{PD}PNA, \text{ and}$$

$$t_{PH}CA_R = tCA_R - K_{CA} = t_{PD}PNC - t_{PD}PNA.$$

In addition, the MS can also determine the PN phase offset of $PNC_R$ with respect to $PNB_R$ even if BS C is not the reference PN:

$$t_{PH}CB_R = t_{PH}CA_R - t_{PH}BA_R = t_{PD}PNC - t_{PD}PNB.$$

FIG. 7 is an exemplary diagram showing the timing relationships of the pilot signals PNA, PNB, and PNC as they are transmitted from the respective BSs and received by the MS. FIG. 7 differs from FIG. 6 in that FIG. 7 does not include the known timing delays $tPNA_T$, $tPNB_T$, and $tPNC_T$. Notice that the only offsets between the transmitted and received signals are due to the propagation delay of the reference signal and the differences in propagation signals from the various BSs.

From these three PN phase offset equations, the MS can estimate the difference in the distances from BS A and BS B to the MS, from BS A and BS C to the MS, and from BS B and BS C to the MS. If the MS is provided with the coordinates of the BSs, it is possible for the MS to estimate its absolute distance from each BS.

Advanced Forward Link Trilateration (AFLT) is a method of determining the position of a MS using the relative PN phase offsets of pilot signals from various BSs. AFLT is very similar to GPS in that position determination is based on propagation delay differences between known reference positions. BSs are comparable to GPS satellites, and both technologies use digital spread spectrum signals. AFLT uses knowledge of the location of each BS, the known fixed PN timing delays for each BS, and the PN phase offsets of the received pilot signals to estimate the distance between the MS and each BS. At least three MS-to-BS propagation delay differences must be known before trilateration is possible. For example, for each of the three propagation delay difference equations shown above, a locus of points can be generated that satisfies each equation. The intersection of these three loci determines the position of the MS. AFLT is typically performed by a position determination entity (PDE) located within the network as shown in FIG. 1, which may be comprised of one or more processors, memory, and the like.

However, there are drawbacks to the conventional AFLT methodology. Referring to FIG. 8, if a MS is using BS A as the reference BS, its timing is synchronized to that of $PNA_R$ (a time reference marker identified in FIG. 8 as t=0). The MS will then attempt to locate any multipath component of $PNB_R$ (for example $PNB_{0R}$, $PNB_{1R}$, or $PNB_{2R}$) at the timing offsets identified in FIG. 8. However, because of limited processing resources, the MS typically cannot search for $PNB_R$'s timing at all times following t=0. Because the MS knows the fixed PN timing delays for BS A and BS B, when the MS acquires and uses PNA as a timing reference, it can search for the timing of $PNB_R$ a certain number of milliseconds from the reference marker at t=0, calculated by using $K_{BA}$. However, this expected timing delay does not take into account the propagation delays $t_{PD}PNA$ and $t_{PD}PNB$. The MS's receiver will therefore have to move around in time to find the exact position of $PNB_R$ within a predefined time window. The MS's receiver compares and correlates the received signal with PNB's known PN sequence in an attempt to determine the PN phase offset $t_{PH}B_0A_R$ when $PNB_R$ is received, relative to $PNA_R$. This value is reported back to the PDE in the form of a Pilot Phase Measurement (PPM) message. Note that the correlation can be performed using any number of correlation algorithms known to those skilled in the art. In addition to the PN phase offset, the PPM transmitted by the MS also contains the measured pilot strength, as well as a metric which represents the MSs best estimate of the standard deviation of the code phase difference.

Ideally, the MS's correlation of the received $PNB_R$ pilot signal would result in a singular result at PN phase offset $t_{PH}B_0A_R$, but because of measurement variations, small variations in the propagation delay, and other factors which contribute to errors, there will be a non-singular statistical distribution around PN phase offset $t_{PH}B_0A_R$ as indicated by the dotted line 66 in FIG. 8. The distribution 66 of the correlation operation indicates potential errors in the determination of PNB's phase, and ultimately in the trilaterated position of the MS. These measurement errors are small, and there are methods to overcome them such as oversampling and averaging, which are known to those skilled in the art. The major source of AFLT position determination errors, and whose magnitude is larger in comparison, is introduced by multipath reflections. It is an object of embodiments of the present invention to reduce errors due to these multipath reflections.

Referring to FIG. 9, if a structure 68 exists in proximity to BS B, for example, PNB can be reflected off the structure before being received by the MS. Similarly, PNB can be reflected off a second structure 70 before being received by the MS. These reflections may cause delayed multipath components to be received by the MS. Referring again to FIG. 8, PNB reflected off of the first structure 68 may be received as $PNB_{1R}$. This multipath signal may be detected and correlated by the MS, with a distribution 72 at PN phase offset $t_{PH}B_1A_R$ in addition to, or instead of, the PN phase offset $t_{PH}B_0A_R$ representing the direct path from BS B to the MS. Similarly, PNB reflected off of the second structure 70 may be received as $PNB_{2R}$. This multipath signal may be detected and correlated by the MS, with a distribution 74 at PN phase offset $t_{PH}B_2A_R$ in addition to, or instead of, the signals detected at PN phase offsets $t_{PH}B_0A_R$ or $t_{PH}B_1A_R$. Note that because the MS typically does not have the computational power to search for multipath components over a large amount of time, it may not find all the multipath components that are present. Thus, the MS could detect a signal at either PN phase offset $t_{PH}B_1A_R$ or $t_{PH}B_2A_R$ and never detect a signal at PN phase offset $t_{PH}B_0A_R$ corresponding to the direct path between BS B and the MS.

Furthermore, the MS may detect BS B's pilot signal at both PN phase offset $t_{PH}B_1A_R$ and $t_{PH}B_2A_R$, and must decide which PN phase offset to report to the PDE. The MS will typically report the PN phase offset corresponding to the earliest arriving signal, because an earlier arriving signal is more likely to be associated with the direct path. In the present example, the MS may report the signal at PN phase offset $t_{PH}B_1A_R$, because the signal reflected from the first structure arrived earlier than the signal reflected from the second structure. However, the MS may not have detected that there is an earlier arriving signal at PN phase offset $t_{PH}B_0A_R$.

If the MS reports a PN phase offset for a BS caused by a multipath signal (not the direct path transmission), its phase measurements are in error. When the MS reports these erroneous phase measurements to the PDE, the PDE will use these phase measurements in trilateration and determine an inaccurate location of the MS. For example, the calculated position of the MS may be farther away from BS B than it really is.

There are several existing techniques that may improve the reliability of the phase measurement provided by the MS, such as oversampling and averaging, increasing the search window, or increasing the search depth. Unfortunately, these techniques require additional processing time at the MS, and cannot ensure that the earliest multipath will be detected.

Current TIA/EIA/IS-801-1 processes employ Sensitivity Assistance (SA) and Acquisition Assistance (AA) messages to assist the MS in locating Global Positioning System (GPS) signals, and no process has been developed for providing assistance to the MS in locating cellular signals. Unlike GPS-based position determination, AFLT must overcome additional difficulties in locating signals due to multipath reflections. Currently, there is no method for providing assistance to the MS when making the above-described phase measurements. If some characteristics of the multipath environment were provided to the MS, it would be able to more accurately report PN phases offsets to the PDE.

Therefore, a need exists for a method and apparatus that provides input to the MS to assist it in reporting correct phase measurements so that an accurate position of the MS can be determined.

SUMMARY OF THE INVENTION

Embodiments of the present invention are directed to methods and apparatus for increasing the accuracy of AFLT position location calculations by enhancing the stability of PPMs by removing errors due to multipath uncertainty. This is accomplished by providing the MS with information about local multipath conditions.

In one embodiment, the PDE may collect statistical data about the reported PN phases from any MS, organized within small geographic regions surrounding a BS. The small geographic regions should be chosen sufficiently small such that the multipath characteristics within a region can be approximated. With a sufficient number of phase measurement samples, the PDE can make general assumptions about the multipath environment within a given region, measured by a plurality of MSs, each MS having different PN search conditions. This can be useful because some MSs may not report the true earliest arriving multipath, and may often report a delayed path component, whereas other MSs may report the earliest arriving multipath component. After calculating an initial position estimate of a MS, the PDE will include the phase data that was reported into the statistical database associated with the region about the BS.

When it is desired to determine the location of a MS, the MS will report to the PDE a multitude of PN phase offset measurements, each corresponding to different BSs (where at least three are required for successful trilateration). Recall that these phase measurements are essentially the difference in propagation delay between a particular BS's pilot signal and the reference BS's pilot signal, as measured at the MS's position. Using only that set of pilot phase measurements, the PDE can determine a rough estimate of the MS's location using conventional AFLT and also determine the region within which the MS is located. In one embodiment, the PDE can then call up the statistical distribution database corresponding to the identified region. The PDE may then determine that the MS did not report an earlier arriving multipath component for a particular BS, and as a result, the PDE may send a message to the MS directing it to search for an earlier arriving signal at a certain time prior to the reported PN phase offset. In one embodiment, the PDE will send the time difference between the earlier arriving multipath component and the reported phase measurement.

The MS then attempts to locate the earliest path component that the PDE is anticipating. As is done in Assisted GPS, the MS can take advantage of the expected code phase position and increase the search depth or use a larger correlation length when searching within a window of time around the expected code phase position. If the MS locates the path, it can report the associated earliest arriving PN phase offset in a follow-up PPM that will be used by the PDE to re-trilaterate the MS's position with more accuracy as well as, in one embodiment, update the statistical database. The pilot phase searching processing is therefore distributed between all MSs in the same geographic region.

Embodiments of the present invention can be implemented by adding an additional message to the existing TIA/EIA/IS-801-1 Pilot Phase Measurement process. FIG. 12 shows an example of the messaging sequence between the PDE and MS. In either MS initiated or terminated sessions, the PDE can respond to a "Provide Pilot Phase Measurement" (PPM) message 100 with a "Provide AFLT Multipath Assistance" (MA) message 102. This MA message should contain the time differences ($\Delta t1$, $\Delta t2$, . . . as shown in FIG. 11) between expected multipath positions (for example: $t_{PH}B_0A_R$, $t_{PH}B_1A_R$, . . . ), which indirectly indicates the expected PN phase offset of the earliest arriving multipath component of a particular BS, with respect to the reference BS. The PDE should provide this information for each BS reported by the MS in the initial PPM message and identified by the PDE as a BS that may benefit from this procedure.

When the MS receives this message, it re-scans the current PN space corresponding to each pilot contained in the MA message. If the MS determines (by utilizing the information given in the MA) that the preceding PPM message contained incorrect PN phase offsets for any of the BSs previously reported, the MS reports the new PN phase offsets in a secondary "Provide Pilot Phase Measurement" message 104. The PDE, upon receiving this message, replaces the old phase measurements with the new ones, and re-trilaterates the MS's position. Both the old and new phase can be used by the PDE for statistical purposes.

BRIEF DESCRIPTION OF THE DRAWINGS

FIG. 7 is similar to FIG. 6, with the exception that the known timing delay between BSs has been removed.

DETAILED DESCRIPTION OF PREFERRED EMBODIMENTS

In the following description of preferred embodiments, reference is made to the accompanying drawings, which form a part hereof, and in which is shown by way of illustration specific embodiments in which the invention may be practiced. It is to be understood that other embodiments may be utilized and structural changes may be made without departing from the scope of the preferred embodiments of the present invention.

As described above, AFLT is a method capable of being performed by the PDE for determining the position of a MS using the PN phase offset measurements of pilot signals received at the MS from various BSs. AFLT uses knowledge of the fixed PN timing delays for each BS, the location of each BS, and PN phase offset measurements reported by the MS to estimate the distance between the MS and each BS, and trilaterate the position of the MS using these estimated distances.

Figure 1:
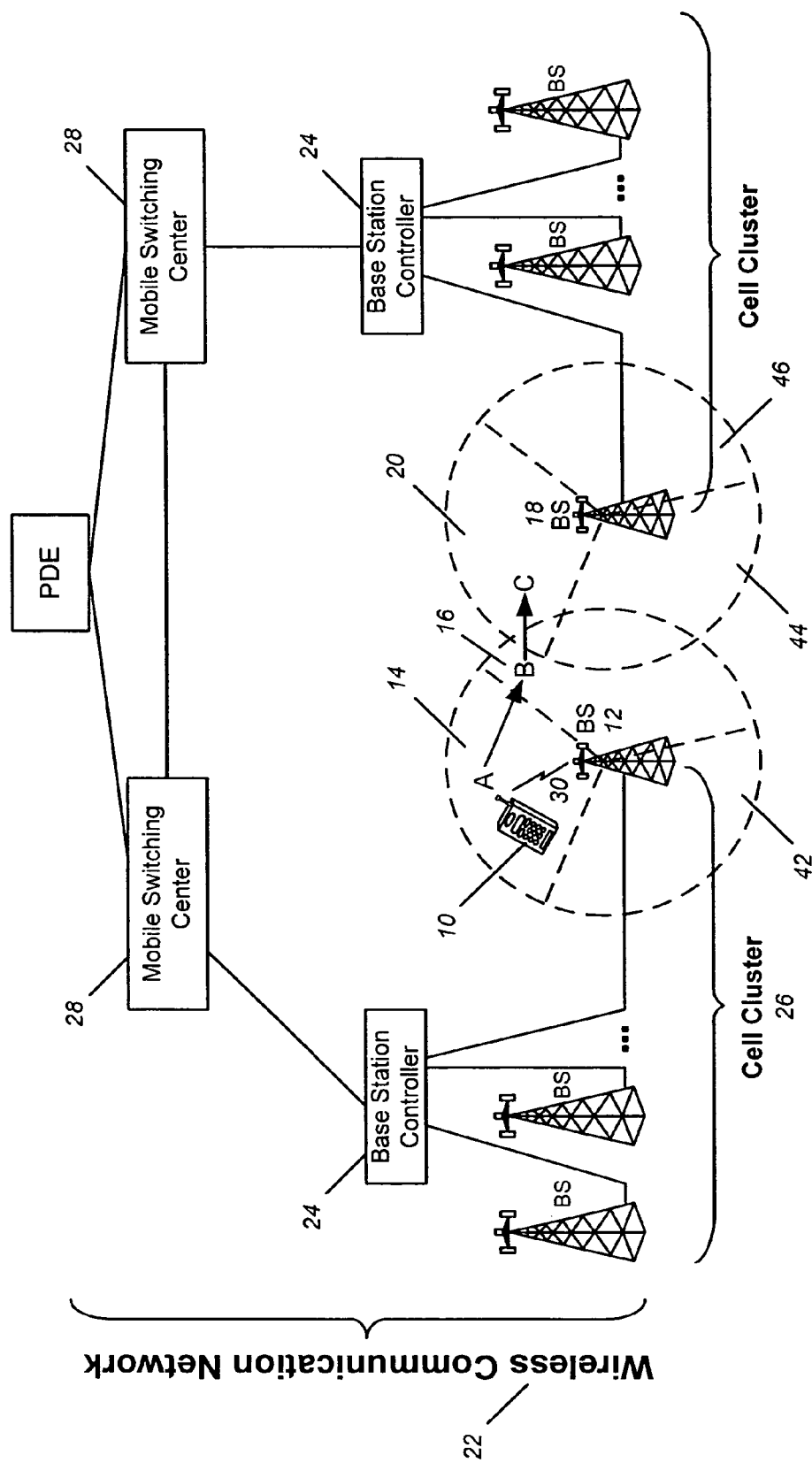
FIG. 1 illustrates an example system environment including a mobile station capable of maintaining a connection with a cellular communication network as the MS roves through a geographic area served by the cellular communication network.
Figure 2:
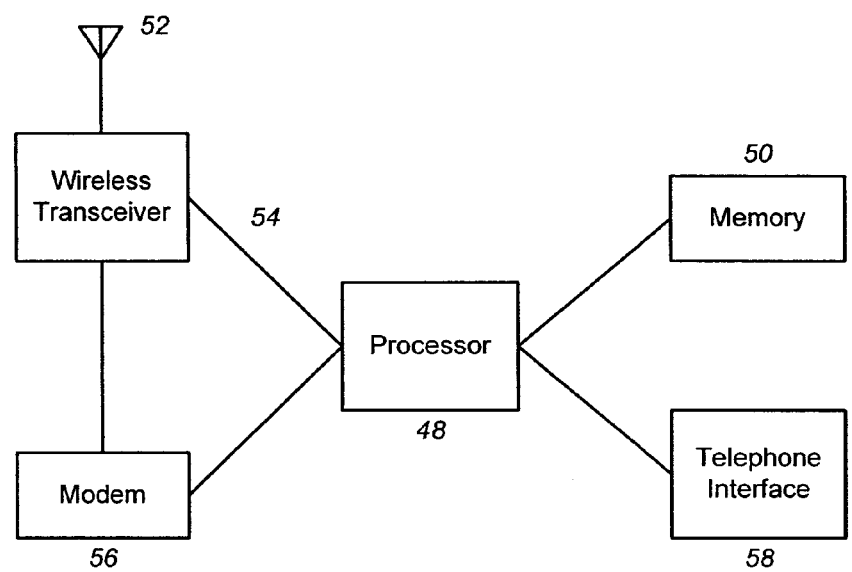
FIG. 2 is a block diagram of an exemplary mobile station architecture.
Figure 3:
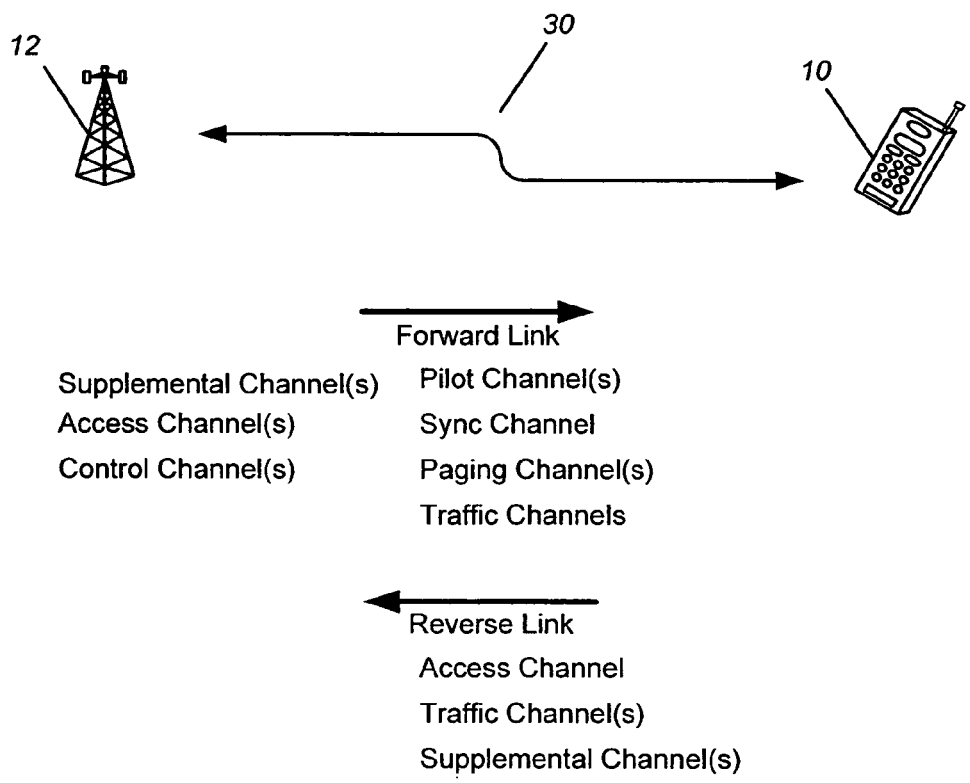
FIG. 3 illustrates an exemplary communication link between a mobile station and a base station in a wireless communication system.
Figure 4:
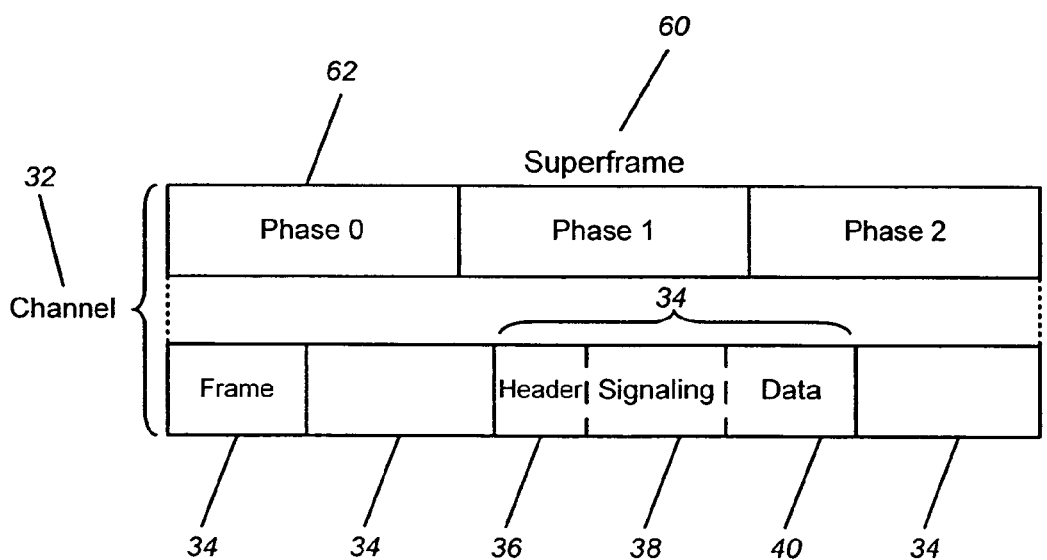
FIG. 4 is a timeline of a superframe divided into three phases and four frames for use in a wireless communication system.
Figure 5:
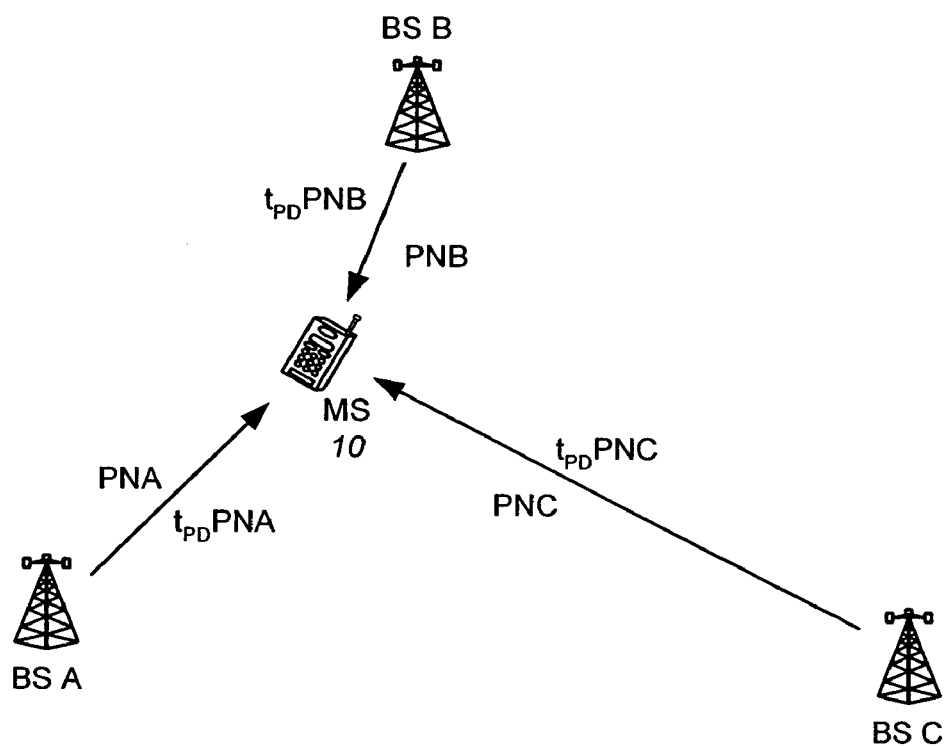
FIG. 5 is an exemplary diagram of a network of three base stations transmitting pilot signals intended for receipt by a mobile station, the received transmissions including propagation delays that are a function of the distance between the base stations and the mobile stations.
Figure 6:
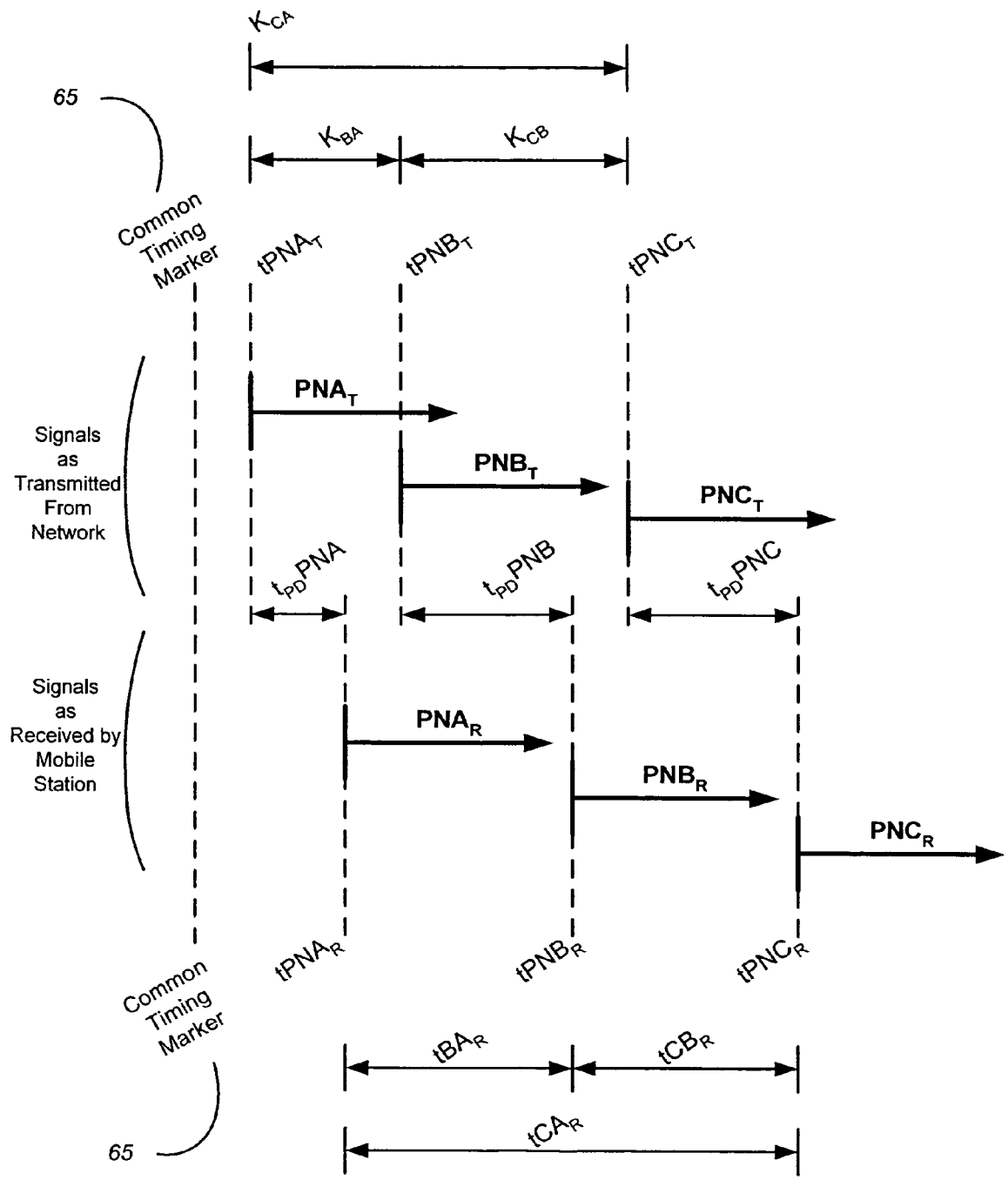
FIG. 6 is an exemplary diagram illustrating the timing of the pilot signals transmitted from base stations, and illustrating the timing of the pilot signals as they are received by the mobile station.
Figure 7:
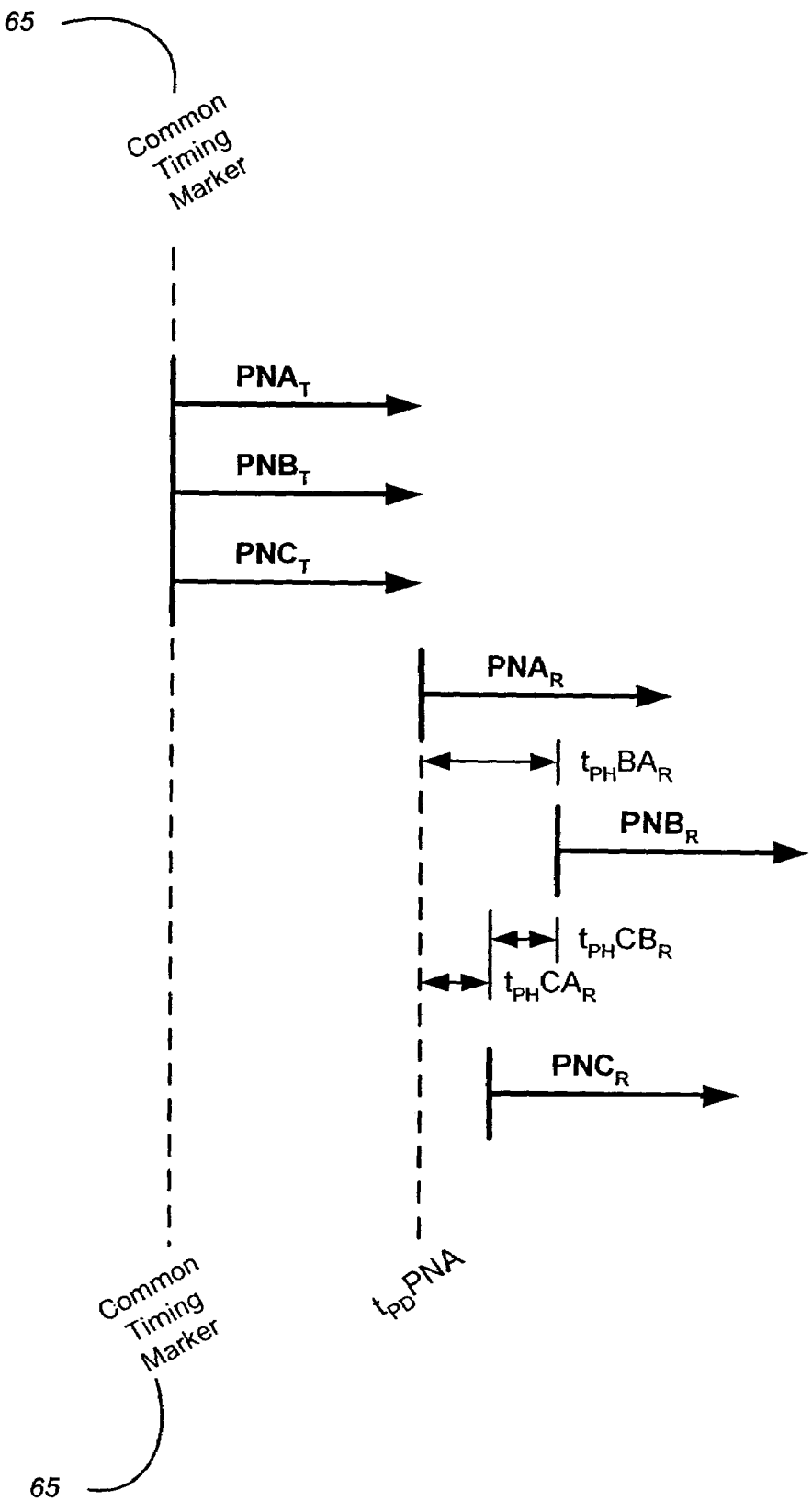
FIG. 7 is an exemplary timing diagram illustrating the unknown PN phase offsets of the pilot signals as they are transmitted from base stations and received by mobile stations.
Figure 8:
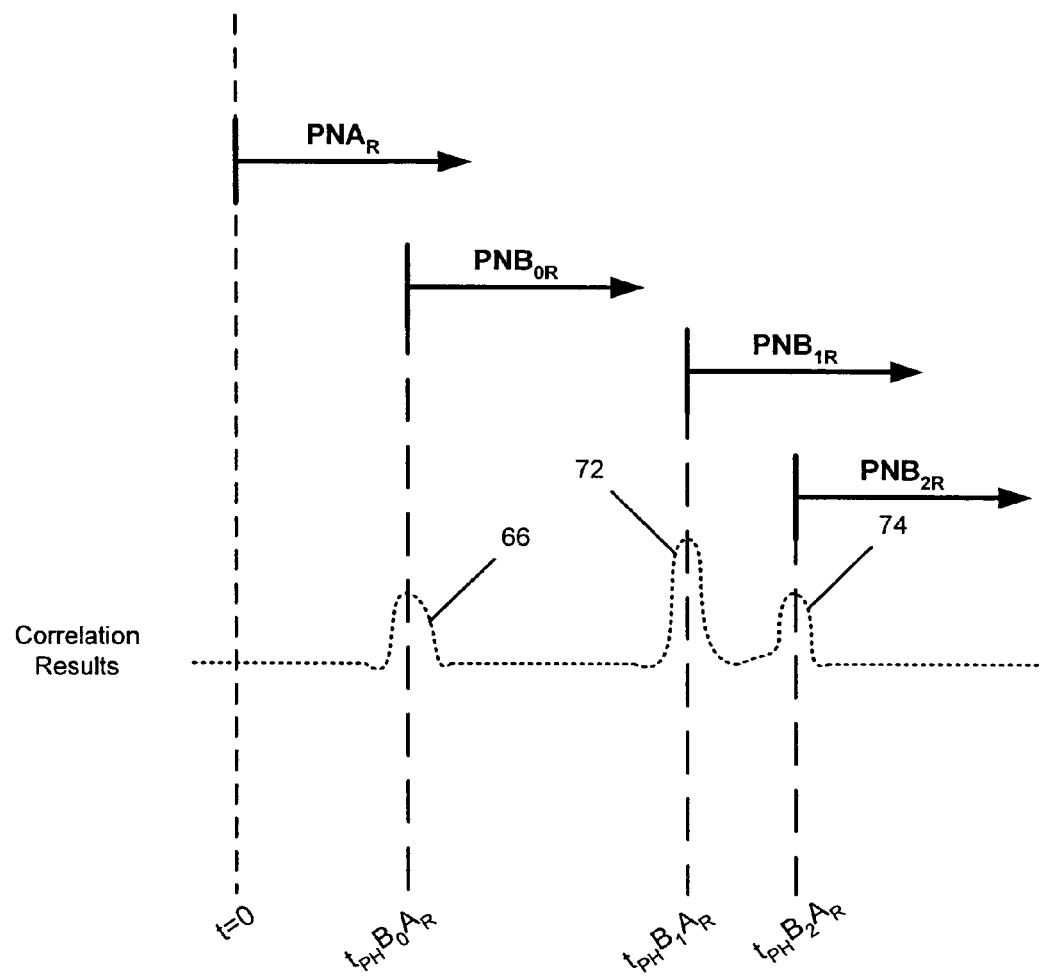
FIG. 8 is an exemplary timing diagram illustrating correlation results between the MS's received signal and the expected signals of a base station in a direct path in addition to two reflected multipaths.
Figure 9:
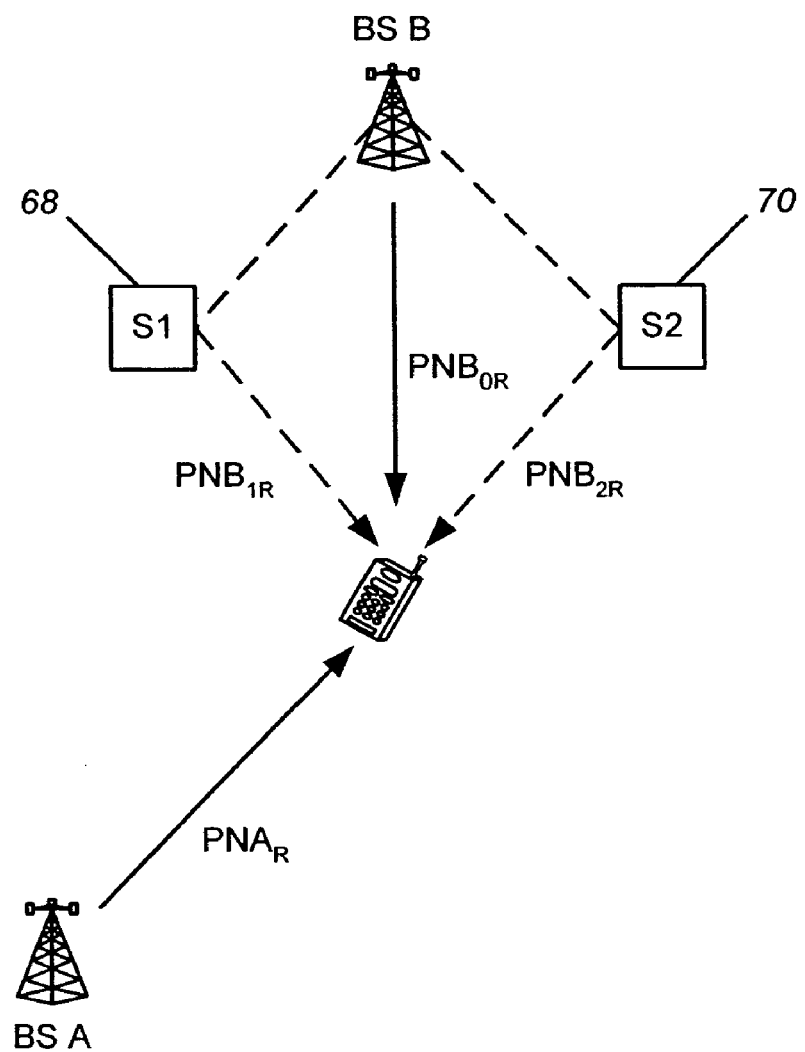
FIG. 9 illustrates a mobile station receiving a reference pilot signal from base station A and receiving three pilot signals from base station B, one direct path and two reflected multipaths.

However, there are drawbacks to the conventional AFLT methodology. Conventional trilateration of a MS's position may be adversely affected by multipath reflections. Referring again to the example of FIG. 8, multipath reflections may cause the MS to detect a PN sequence at any one of a number of PN phase offsets $t_{PH}B_0A_R$, $t_{PH}B_1A_R$, and $t_{PH}B_2A_R$, for example. Although the PN phase offset $t_{PH}B_0A_R$ represents the most direct or optimal path between the MS and BS B, the MS may not detect PN phase offset $t_{PH}B_0A_R$, but rather detect and report PN phase offset $t_{PH}B_1A_R$ or $t_{PH}B_2A_R$, which are reflected signals. The MS may not detect the direct path because the signal may be disrupted by trees or buildings, for example, while a reflected signal is received the strongest. The absorption coefficients of the materials in the path and how a signal is reflected can have an affect on which path is received the strongest or detected most frequently. Even if the direct path had the highest received energy, the MS may still not detect it due to propagation phenomena such as blocking or shadowing. It is also possible that an apparent optimal path may appear at a very early time, but the amplitude of the signal may be low, indicating that it is not the optimal path but rather caused by spurious noise. If the MS detects and reports the PN phase offset of a non-direct path, the PDE will determine an inaccurate location of the MS.

Inaccuracies in the position calculation due to multipath reflections may be overcome if the MS is made aware of the PN phase offset that the PDE considers to be associated with the optimal path that the MS is expected to be capable of detecting. Embodiments of the present invention are directed to methods and apparatus for enhancing the accuracy of AFLT position location calculations by removing pilot phase measurement errors due to multipath uncertainty, specifically by providing the MS with information about nearby multipath conditions. In one embodiment, the MS may be provided this information by messages sent to it by the PDE using a forward traffic channel of the communication system. In another embodiment, the MS may be provided this information by messages sent to it by the PDE using a forward common channel, such as the paging channel. The information may be included in existing messages, or a new message may be defined for the purposes set forth by this invention.

The information transmitted to the MS by the PDE assists the MS when measuring the pilot phase offsets of nearby BSs. The information transmitted to the MS is determined by the PDE, and serves to communicate the PN phase offset associated with the optimal signal path. Since the PDE does not empirically know the multipath environment that the MS is operating in, it must rely on historical PPMs reported by all MSs to determine the optimal path. In one embodiment, this is accomplished by maintaining a statistical database of reported PN phase offset measurements within the PDE, or an entity such as a server connected to it. In another embodiment, a statistical database of pilot energy measurements associated with reported PN phase offset measurements can be maintained within, or connected to, the PDE. Further, in another embodiment, a statistical database of both PN phase offset measurements and the pilot energy measurements associated with those PN phase offset measurements can be maintained within, or connected to, the PDE. In a PPM, MSs will report the phase position, associated pilot energy, and estimated phase measurement error (in terms of standard deviation) of a particular multipath component. The database can be constructed by considering the number of times, or frequency of occurrence, of MSs that have reported a specific PN phase offset. Alternatively, the database can be constructed by considering the received energies of specific PN phase offsets, by averaging the reported energy from all MSs. The difference between these two methods is that, in the first method, the PDE is considering the probability of MSs choosing to report a specific PN phase offset, while in the second method, the PDE is considering the probability of MSs detecting a specific PN phase offset of sufficient energy. The database can also be constructed by considering both the frequency of occurrence and average energy associated with received PPMs. Furthermore, in another embodiment, the database can also weight the statistics by using the estimated phase measurement errors reported by the MS and/or the age of individual measurements. The appropriate weighting of these inputs can be determined by those skilled in the art.

When a MS reports phase measurements, the PDE can determine the likelihood that these phase measurements are, in fact, associated with the propagation path that the PDE determines to be the most direct one. The PDE can determine the most direct path by using the statistical database. If the PDE determines that the reported PN phase offsets were associated with the most direct path, the PDE will use the reported phase measurements to calculate the position of the MS. If however, the PDE determines that the reported PN phase offsets were not associated with the most direct path, the PDE may choose to provide information that will inform the MS of the PN phase offset of the most direct path. The information can be the PN phase offset relative to the PN phase offset that the MS reported, or it may also be the PN phase offset relative to the reported reference BS. The MS, when provided with this assistance, will attempt to detect the direct path signal, and if it is successful, will generate a secondary pilot phase measurement containing the new PN phase offset. The PDE will then be capable of calculating a more accurate position location measurement using AFLT.

Figure 10:
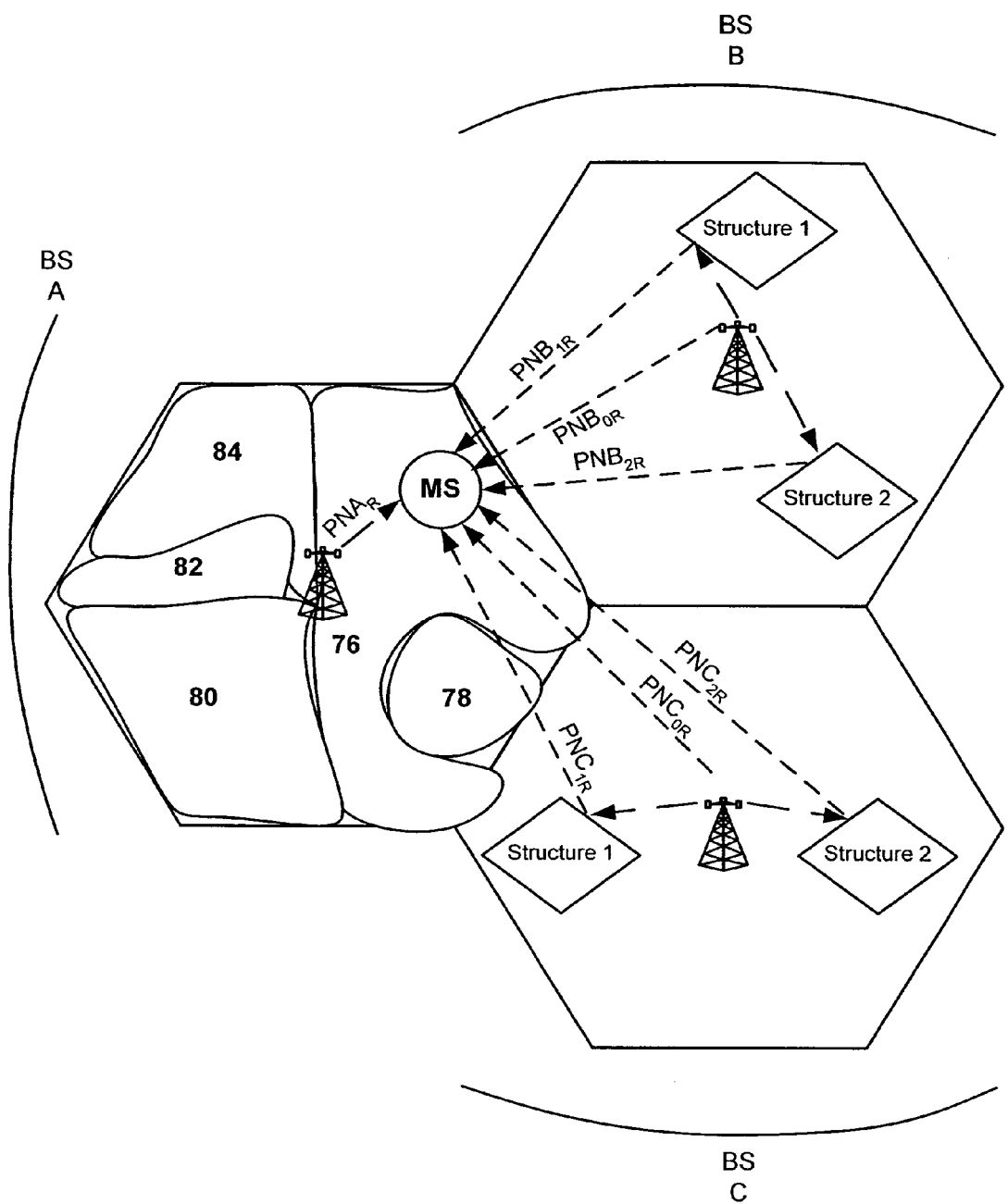
FIG. 10 is an exemplary diagram showing five regions surrounding a reference base station A for which a statistical distribution of collected pilot phase measurements (from base stations A, B, and C) from mobile stations which are located within those regions is maintained, according to embodiments of the present invention.
Figure 11:
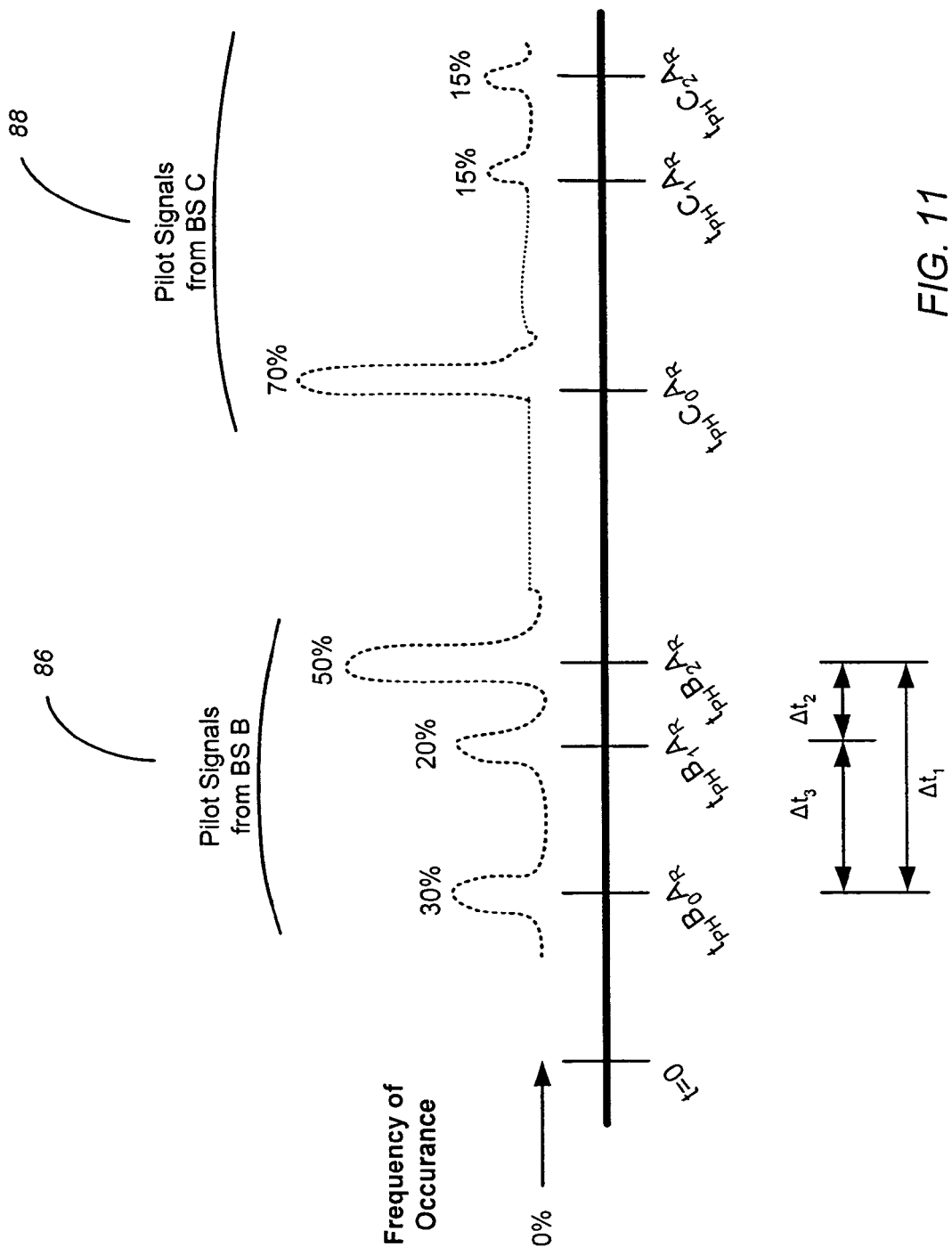
FIG. 11 is an exemplary timing diagram illustrating the compiled statistical distribution of pilot phase measurements (associated with the example of FIG. 10) received by the position determination entity from mobile stations within a region, according to an embodiment of the present invention.
Figure 12:
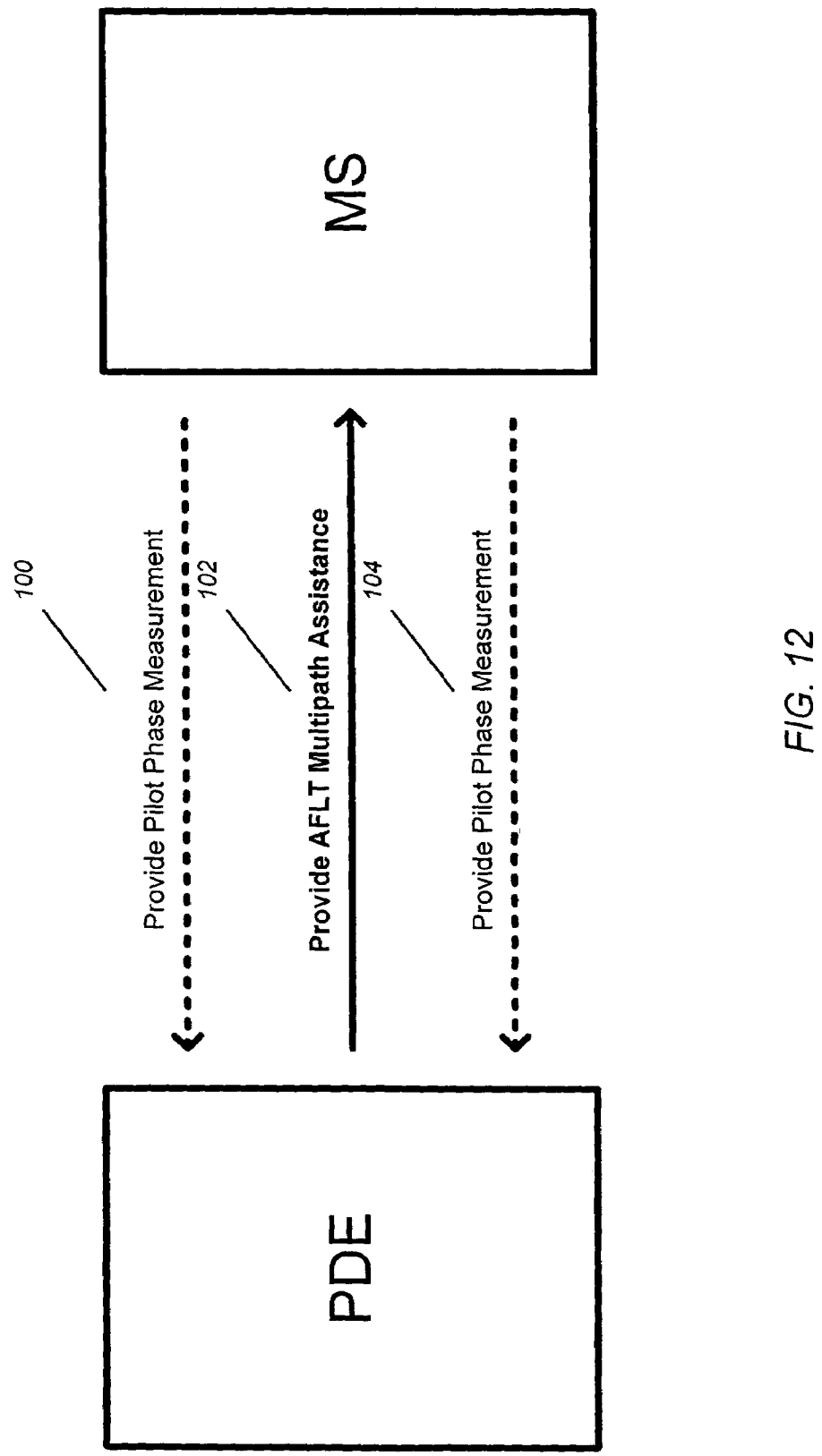
FIG. 12 is an exemplary diagram briefly illustrating the messaging between the PDE and the MS and the additional message that may be employed to support embodiments of the present invention.

FIGS. 10 and 11 are exemplary diagrams that serve to show, by example, one implementation of the invention. The statistical database compiled by the PDE can be divided into multiple regions for each BS. FIG. 10 is a diagram showing five regions surrounding BS A for which a database consisting of received PPMs from MSs located within those regions is maintained according to the present invention. In the example of FIG. 10, five regions 76, 78, 80, 82 and 84 are defined, but in embodiments of the present invention, the number of regions maintained for a given BS may be dependent on the variation in the compiled statistical database of PPMs surrounding that BS. Notice that in this example, BS A is omni-directionally configured, such that there is only one transceiver within the cell that can be used as a reference. If BS A was configured with multiple sectors (as is typically done) the PDE may choose to compile statistics based on regions within each of the sectors of the cell. The MS of FIG. 10, using $PNA_R$ from BS A as a reference, is receiving three multipath signals each from both BS B and C. $PNB_{0R}$ and $PNC_{0R}$ are signals from BS B and C without reflections, thus they are considered the optimal path. $PNB_{1R}$ and $PNB_{2R}$ are multipath reflections from Structures 1 and 2, respectively, within BS Bs coverage area. $PNC_{1R}$ and $PNC_{2R}$ are multipath reflections from Structures 1 and 2, respectively, within BS Cs coverage.

For example, if the compiled statistical database of PPMs is very similar at any point surrounding the reference BS, only one region may be needed. This may occur in areas where there are few opportunities for multipath reflections. However, if the compiled statistical database of PPMs varies greatly at different points surrounding the reference BS, many regions may need to be maintained. This may occur in areas where there are many opportunities for multipath reflections. In other words, the PDE may empirically establish regions such that MSs within the same region will experience similar multipath reflections from neighboring BSs and therefore similar statistics, while MSs in different regions will experience different multipath reflections and therefore different statistics. These regions should be constructed in a manner such that the physical area capable of being covered by a single transceiver is divided into regions where the multipath propagation characteristics from neighboring transceivers are similar. For optimal performance, these regions should be constructed in real-time, depending on the information contained in the received PPMs. The key objective of creating these regions is to compile a statistical database of pilot phase measurements of all MSs that are using the same transceiver as a reference. If the regions are appropriately configured, a PDE should be able to statistically predict phase measurements that a MS would report, if the MS's region and reference sector were known.

It should be understood that each BS in a network might be used as reference BS, so although not shown in FIG. 10, in embodiments of the present invention, the PDE must define one or more regions around each BS in a network. For example, because BS C can be used as a reference BS, the PDE must also define regions around BS C. The regions defined for each BS may partially or completely overlap with the regions defined for other BSs, and therefore multiple regions may cover a particular location, each region corresponding to a different BS being used as a reference. In one embodiment, to conserve memory and processing time, the PDE may choose to combine the statistics of multiple regions, even if they correspond to different reference BSs. This however, should only be done if the PDE determines that the statistics of these regions exhibit similar multipath propagation from neighboring BSs. In another embodiment, to maintain updated statistics, the PDE could use only the "N" most recent reported pilot phase measurements, where "N" is predetermined with regard to performance and memory capacity requirements.

FIG. 11 is an exemplary timing diagram illustrating the compiled statistics of PPMs received by the PDE from MSs located within region 76 of FIG. 10, each MS using BS A as a reference, according to an embodiment of the present invention. The three peaks of each grouping are related to the three multipath signals from each BS, as seen in FIG. 10. For example, the 20% peak from BS B of FIG. 11 (with PN phase offset of $t_{PH}B_1A_R$) corresponds to the propagated signal $PNB_{1R}$ (reflected off Structure 1) in FIG. 10. Based on the reported PN phase offsets and the reported reference BS, the PDE will use AFLT to compute an estimated position of the MS, and in embodiments of the invention, identify the region covering that position (region 76 in the present example), possibly resulting in sending the MS information contained within the statistical database for that region. The MS may then be able to provide more accurate PN phase offset measurements to the PDE, which will result in more accurate calculation of the MSs position.

In the example of FIG. 10, the statistical database is generated by the PDE using only the frequency of occurrence of pilot phase measurements, without respect to energy measurements or estimated measurement errors. As such, the database is actually a statistical distribution, indicating the frequency of occurrence of specific PN phase measurements received. It is re-emphasized however, that this statistical database can be generated by considering any information provided to the PDE in the PPM. Over time, the PDE will compile previously reported pilot phase measurements from multiple MSs in a particular region and create the statistical distribution shown in FIG. 11. Note that one distribution 86 in FIG. 11 corresponds to pilot signals received in direct and reflected paths from BS B, while another distribution 88 corresponds to pilot signals received in direct and reflected paths from BS C. Note also that because region 76 corresponds to reference BS A, the pilot phase offsets reported by MSs in region 76 with a statistical distribution as shown in FIG. 11 are all defined with respect to a reference time t=0, established when the MS receives a pilot signal from reference BS A.

Notice that in this example, there appears to be phase offsets that have a higher frequency of occurrence ($t_{PH}B_0A_R$, $t_{PH}B_1A_R$, and $t_{PH}B_2A_R$) than others. The database can therefore be generally considered to be a measurement of the probability that a MS will detect or report specific PN phase offsets. The PDE must determine which PN phase offsets do and do not have a "strong enough" metric to be considered as potential phase offsets for use within the scope of this invention. For example, if the statistical database is constructed by considering frequency of occurrence, the PDE may determine that only PN phases with a frequency greater than 20% should be considered valid. For purposes of discussion, we shall define these PN phases in which the database contains a metric value of sufficient measure (as determined by the PDE) to be a "peak" in the data, wherein peak is defined as a relative local maximum.

The amplitude of the peaks in the statistical distributions shown in FIG. 11 are an indication of how often MSs that are using BS A as a reference, and located within region 76, reported specific PN phase offsets. In the example of FIG. 11, higher peaks indicate a higher frequency of occurrence. However, it should be understood that the amplitude of the peaks may also indicate an average pilot energy for the PN phase offsets associated with that peak, or the amplitudes may represent a combination of the frequency of occurrence and the average pilot energy for the PN phase offsets associated with that peak. This combined value may be a weighted sum or product of the frequency of occurrence and the average pilot energy, or some other formula combining these two parameters. In the example of FIG. 11, 50% of the reports indicated a PN phase offset at time $t_{PH}B_2A_R$, 30% of the reports indicated a PN phase offset at time $t_{PH}B_0A_R$, and 20% of the reports indicated a PN phase offset at time $t_{PH}B_1A_R$. Not all MSs may be able to detect a specific PN phase offset, and a specific MS may not be able to always detect the same PN phase offset. As such, it is possible that, as shown in FIG. 11, the MS actually sees a reflected path (at time $t_{PH}B_2A_R$) more often that the direct or optimal path (at time $t_{PH}B_0A_R$).

The compiled statistical distribution in the example of FIG. 11 indicates that more MSs will report a PN phase offset at time $t_{PH}B_2A_R$ than at time $t_{PH}B_1A_R$ or $t_{PH}B_0A_R$. Those MSs that report a PN phase offset at either $t_{PH}B_2A_R$ or $t_{PH}B_2A_R$ may not have found the earliest arriving signal from the direct or optimal path. When the PDE determines that the reporting MS has provided a phase measurement corresponding to time $t_{PH}B_1A_R$ or $t_{PH}B_2A_R$, it can deduce that, if the MS is actually located in the region in which the PDE has estimated (given the initial phase data), it is possible that the MS was unable to detect the PN phase offset at time $t_{PH}B_0A_R$. As such, the PDE may wish to request the MS to attempt to detect a PN phase offset at time $t_{PH}B_0A_R$.

Continuing the example of FIGS. 10 and 11 for purposes of illustration only, in embodiments of the present invention, when a MS reports a set of PN phase offsets to the PDE, the PDE will receive this reported set of PN phase data and use AFLT to compute a rough estimated position of the MS, identify the region covering that position (region 76 in the present example), and include the set of reported PN phase data in the statistical database for that region. In one embodiment of the invention, the PDE will then correlate the reported PN phase offset with that of the earliest phase (optimal path), time $t_{PH}B_0A_R$, contained within the statistical database corresponding to the same reference PN that the MS is using and region that the MS is within. This correlation may be implemented by calculating the time difference between the reported PN phase offset measurement and the "peaks" of the dataset for that region, within the statistical database. This correlation may result in a "favorable comparison" if the difference is smaller than some predetermined amount. For example, consider the MS in the example 86 of FIG. 11. If the MS reports a PN phase offset equal to $t_{PH}B_1A_R+X$, as long as the absolute value of X is smaller than the predetermined amount required for a favorable comparison by the PDE, the PDE will consider the MSs PN phase offset measurement to be associated with the multipath identified in the database with frequency of occurrence of 20%. This correlation operation is dependent on the peak detection operation (i.e. at which positions the PDE considers a peak). If the PDE determines that the MS did not report the phase corresponding to the earliest phase expected ($t_{PH}B_0A_R$ in this example), it might choose to request the MS to search again for the earlier path.

If the MS initially provides the pilot phase corresponding to $t_{PH}B_2A_R$, the PDE will be able to determine, from the compiled statistical distribution, that there is likely a multipath signal that the MS may be able to find at time $t_{PH}B_0A_R$. Therefore, in embodiments of the present, invention, the PDE can send a message back to the MS, indicating to the MS that it should attempt to locate a particular BS's pilot signal at an earlier PN phase offset at time $t_{PH}B_0A_R$, such as was previously reported by other MSs in the region. In one embodiment, the information in the message sent from the PDE to the MS, informing it of potentially earlier signals, may be time differences such as a Δt1 value (see FIG. 11), instructing the MS to look for an earlier arriving pilot signal at an amount of time Δt1 earlier than when it found the originally reported pilot signal.

Although the PN phase offset at time $t_{PH}B_0A_R$ likely represents the direct or optimal path PN phase offset and the most accurate indicator of the position of the MS, in other embodiments of the present invention, the PDE may send a message to the MS identifying any or all earlier arriving PN phase offsets, such as $t_{PH}B_0A_R$ and/or $t_{PH}B_1A_R$ in the present example, and instructing the MS to attempt to detect PN phase offsets at these times. For example, the message sent by the PDE may contain delta time difference measurements Δt1, Δt2 or Δt3, as shown in FIG. 11, to identify the locations of one or more known PN phase offsets. This may be useful because if the MS cannot locate an optimal path's PN phase offset at time $t_{PH}B_0A_R$, but is able to locate an improved path PN offset at time $t_{PH}B_1A_R$, at least the PDE can generate a more accurate estimate of the position of the MS using the improved path PN phase offset at time $t_{PH}B_1A_R$. Alternatively, the PDE could instruct the MS to look for multiple improved path PN phase offsets in a particular sequence until one is found, such as $t_{PH}B_0A_R$, followed by $t_{PH}B_1A_R$.

In one embodiment of the present invention, the PDE may consider the frequency of phase data contained in the compiled statistical distribution. For example, even if a certain PN phase offset is the earliest arriving, if it has a small frequency (e.g. a peak with a low amplitude, indicating a low probability of detection by the MS), the PDE may not include this PN phase offset in its message to the MS, because this PN phase offset may be an anomaly and not indicative of the direct path. In another embodiment, the PDE may only notify the MS of the earliest occurring PN phase offset. In yet another embodiment, the message from the PDE can also provide the MS with the statistical probabilities associated with the phase offsets of each multipath component of a pilot channel (30%, 20%, and 50% in the example 86 of FIG. 11) to be located (i.e. the probability that a MS will locate that signal phase offset). The MS may use these probability values to prioritize its search for an earlier arriving PN phase offset.

It should be noted that the accuracy of the compiled statistical distribution of PN phase offsets, and ultimately the location of the MS, is affected by the reference BS. In the example of FIG. 11, because the MS is using BS A's pilot channel as its reference to establish a zero time reference (t=0 in the present example), everything that the MS does with respect to clocks, signals, and PN phase offset measurements will be based on time reference point t=0. However, because reference point t=0 is established based on a signal received from BS A, the reference point t=0 may also shift due to multipath propagation of the reference signal. Periodically, such as every 20 ms, the MS may verify the timing of BS A's pilot channel, and it may find that the reference point t=0 has shifted. For example, a strong multipath signal caused by a parked truck may influence the reference point t=0 to such an extent that when the truck is driven away, the correlated reference point t=0 may shift in time accordingly. This would result in a shifting, in the time domain, of FIG. 11. It is important to recognize that as the reference point t=0 moves, the measured PN phase offsets relative to the reference ($t_{PH}B_0A_R$, $t_{PH}B_1A_R$, and $t_{PH}B_2A_R$) will be affected, but the relative timings ($\Delta t1$, $\Delta t2$, and $\Delta t3$) will not be affected. As such, it may be desirable for the PDE to send all delta time difference measurements ($\Delta t1$, $\Delta t2$ and $\Delta t3$) to the MS. If the reference point t=0 has moved to the extent that the MS can not detect a signal at the absolute PN phase offset which the PDE is providing, but the MS can find a peak elsewhere, the MS may search at times $\Delta t1$, $\Delta t2$, and $\Delta t3$ from the detected peak, in an attempt to locate the new PN phase offset associated with the offset that the PDE provided.

It should also be clear that the MS is not expected to find a multipath signal at the exact PN phase offset provided by the PDE. Consider an example where the statistical database for a square region is compiled using four pilot phase measurements taken from MSs, one in each corner of the region. The statistical database would then contain expected PN phase offsets representative of a MS located in the center of the square. As such, a MS that is located further from the BS than the geometric center of the statistical database is expected to, in a follow up PPM, report a PN phase offset that is slightly later than the PN phase offset that the PDE expects. The larger the regions are, the greater the deviation in the data. These deviations are important because they provide the PDE with information of the MS's position within the region. For these reasons, consideration should be given to the construction of these regions. In one embodiment of the invention, the PDE may choose to bias the PN phase offsets contained within the statistical database by using the initial position estimate of the MS. In another embodiment, the PDE may choose to bias the contents of the message 102 it sends to the MS by using the initial position estimate of the MS.

As was mentioned above, the statistical database may become quite large, and if not managed correctly, would require significant storage space and computational power. There are many ways to reduce the database to manageable sizes, and these techniques are known to those skilled in the art. For example the PDE may use only the last "N" phase measurement reports or combine data from various regions where the multipath environment is similar. It is also possible to convert the database into functions of mathematical functions (similar to wavelet or Fourier composition), where the PDE would only need to retain and adjust the weighting factors for a specific region.

In embodiments of the present invention, when the MS reports a set of pilot phase measurements to the PDE, the message is transmitted using data-burst transport, and the specific message contents are specified by the TIA/EIA/IS-801-1 standard. The pilot phase measurements are generally communicated over a reverse link channel such as a traffic channel. Similarly, when the PDE transmits messages to the MS, the messages are transmitted using data-burst transport, and the specific message contents are specified by the TIA/EIA/IS-801-1 standard. The additional PDE-to-MS message that is necessary to support the present invention, should identify phase differences, described above, by providing absolute or incremental delta time values from the phase measurement initially reported by the MS.

Although the methodologies for providing a MS with statistics about local multipath conditions to improve the accuracy of AFLT position location calculations described hereinabove used a cellular network as an example, the basic concepts of providing a MS with statistics about local multipath conditions to improve the accuracy of AFLT position location calculations are applicable to or may be extended to other wireless protocols and technologies such as paging systems, satellite communication systems, cordless phone systems, fleet communication systems, and the like. The concept of a BS described herein encompasses repeaters or different antenna diversity schemes, a cordless base, a satellite or another telephone, and the like. The concept of a MS described herein encompasses a pager, a satellite phone, a cordless phone, a fleet radio, a wireless terminal device, a Telematics control unit, and the like.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. In a system comprising a mobile station (MS) and a network of base stations (BSs) communicatively couplable to the MS for establishing connections and maintaining communication channels between them, one or more of the BSs capable of transmitting a unique pilot signal and being used as a reference BS, the MS capable of selecting one of the BSs as the reference BS for use as a timing reference and measuring pseudo-noise (PN) phase offsets for the pilot signals transmitted from non-reference BSs, a method of generating pilot phase measurements (PPMs) for reporting PN phase offsets, comprising:

measuring a first PN phase offset of a pilot signal transmitted from a non-reference BS and received at the MS, and reporting the first PN phase offset in a first PPM;

predicting whether the first PN phase offset is an optimal path PN phase offset; and if the first PN phase offset is not predicted to be the optimal path PN phase offset, providing the MS with information regarding PN phase offsets for a next measurement, re-measuring the PN phase offset at the MS in accordance with the information, and reporting one or more improved path PN phase offsets in a second PPM.

2. The method as recited in claim 1, further comprising:

for each BS in the network capable of being used as a reference BS, defining one or more regions around and associated with each BS;

for each of the one or more regions, compiling a statistical database of previously reported PN phase offsets from MSs whose locations are estimated to be within the region and that utilize the BS associated with the region as their reference BS, wherein the compiled statistical database is determined to contain one or more peaks, each peak resulting from a compilation of previously reported and similarly timed PN phase offsets, identifying one or more groups of peaks from within the compiled statistical database for the region, each identified group of peaks corresponding to the previously reported PN phase offsets of the pilot signals transmitted by a specific non-reference BS, and for each identified group of peaks, selecting one of the peaks as representing the optimal path PN phase offset for the specific non-reference BS associated with that group of peaks, and selecting one or more of the peaks as representing the one or more improved path PN phase offsets for the specific non-reference BS associated with that group of peaks;

estimating a location of the MS using PN phase offsets previously reported by the MS;

identifying the compiled statistical database corresponding to the region encompassing the estimated location of the MS;

identifying the group of peaks from within the identified compiled statistical database corresponding to the non-reference BS associated with the first PN phase offset; and predicting whether the first PN phase offset is the optimal path PN phase offset by determining whether the first PN phase offset favorably compares to the peak representing the optimal path PN phase offset from within the identified group of peaks.

3. The method as recited in claim 2, further comprising providing the MS with information for locating the one or more improved path PN phase offsets by:

calculating one or more time differences between the first PN phase offset and the one or more improved path PN phase offsets within the identified group of peaks; and providing the MS with the one or more time differences to assist the MS in locating and measuring the one or more improved path PN phase offsets.

4. The method as recited in claim 2, further comprising providing the MS with information for locating the one or more improved path PN phase offsets by:

calculating one or more time differences between a reference PN phase offset from the reference BS and the one or more improved path PN phase offsets within the identified group of peaks; and providing the MS with the one or more time differences to assist the MS in locating and measuring the one or more improved path PN phase offsets.

5. The method as recited in claim 2, wherein if the MS is provided with the information for locating the one or more improved path PN phase offsets, the method further comprises:

locating and measuring a second PN phase offset of a pilot signal received at the MS from a non-reference BS using the information for locating the one or more improved path PN phase offsets; and reporting the second PN phase offset in a second PPM.

6. The method as recited in claim 5, wherein if the second PN phase offset is reported in the second PPM, the method further comprises predicting whether the second PN phase offset corresponds to one of the improved path PN phase offsets by determining whether the second PN phase offset favorably compares to one of the peaks representing one of the improved path PN phase offsets from within the identified group of peaks.

7. The method as recited in claim 2, wherein if the first PN phase offset is predicted to be the optimal path PN phase offset, the method further comprises utilizing the first PN phase offset in Advanced Forward Link Trilateration (AFLT) position location calculations to assist in determining the location of the MS.

8. The method as recited in claim 6, wherein if the second PN phase offset is predicted to be one of the improved path PN phase offsets, the method further comprises utilizing the second PN phase offset in Advanced Forward Link Trilateration (AFLT) position location calculations to assist in determining a location of the MS.

9. The method as recited in claim 2, wherein for each identified group of peaks in each of the one or more regions, the method further comprises identifying an earliest arriving peak as representing the optimal path PN phase offset for the specific non-reference BS associated with that group of peaks.

10. The method as recited in claim 2, wherein for each identified group of peaks in each of the one or more regions, the method further comprises identifying an earliest arriving peak having an amplitude above a predetermined threshold as representing the optimal path PN phase offset for the specific non-reference BS associated with that group of peaks.

11. The method as recited in claim 2, wherein for each identified group of peaks in each of the one or more regions, the method further comprises identifying those peaks having an earlier arrival time than the first PN phase offset as representing the one or more improved path PN phase offsets for the specific non-reference BS associated with that group of peaks.

12. The method as recited in claim 11, further comprising providing the MS with information for locating the one or more improved path PN phase offsets by:

calculating one or more time differences between the first PN phase offset and the one or more improved path PN phase offsets within the identified group of peaks; and providing the MS with a prioritized sequence of the one or more time differences to assist the MS in locating and measuring the one or more improved path PN phase offsets.

13. The method as recited in claim 2, further comprising:

including an amplitude value in the compiled statistical database for each of the one or more peaks in each of the one or more regions; and identifying those peaks having an earlier arrival time than the first PN phase offset and having an amplitude value above a predetermined threshold as representing the one or more improved path PN phase offsets for the specific non-reference BS associated with that group of peaks.

14. The method as recited in claim 13, each amplitude value representing a frequency of occurrence of the PN phase offsets associated with each peak.

15. The method as recited in claim 13, each amplitude value representing an average pilot energy of the PN phase offsets associated with each peak.

16. The method as recited in claim 13, each amplitude value representing an combination of a frequency of occurrence and an average pilot energy of the PN phase offsets associated with each peak.

17. The method as recited in claim 13, further comprising providing the MS with information for locating the one or more improved path PN phase offsets by:
   calculating one or more time differences between the first PN phase offset and the one or more improved path PN phase offsets;
   creating a prioritized sequence of the one or more time differences for the one or more improved path PN phase offsets in descending order according to the amplitude value of the peak associated with each improved path PN phase offset; and
   providing the MS with the prioritized sequence of the one or more time differences to assist the MS in locating and measuring the one or more improved path PN phase offsets.

18. The method as recited in claim 2, further comprising defining the one or more regions around each BS such that any MSs within the same region that utilize the BS associated with the region as their reference BS will report similar PN phase offsets, while any two MSs in different regions that utilize the BS associated with the region as their reference BS will report different PN phase offsets.

19. The method as recited in claim 2, wherein the statistical database is compiled using a predetermined number of most recently reported PN phase measurements.

20. In a system comprising a mobile station (MS) and a network of base stations (BSs) communicatively couplable to the MS for establishing connections and maintaining communication channels between them, one or more of the BSs capable of transmitting a unique pilot signal and being used as a reference BS, the MS capable of selecting one of the BSs as the reference BS for use as a timing reference and measuring pseudo-noise (PN) phase offsets for the pilot signals transmitted from non-reference BSs, a position determination entity (PDE) for assisting in MS generation of pilot phase measurements (PPMs) for reporting PN phase offsets, comprising:
   a PDE processor programmed for
      receiving a first PN phase offset of a pilot signal transmitted from a non-refrence BS and received at the MS in a first PPM,
      predicting whether the first PN phase offset is an optimal path PN phase offset, and
      if the first PN phase offset is not predicted to be the optimal path PN phase offset, providing the MS with information regarding PN phase offsets for a next measurement so that MS can re-measure the PN phase offset in accordance with the information, and reporting one or more improved path PN phase offsets in a second PPM.

21. The PDE as recited in claim 20, the PDE processor further programmed for:
   defining one or more regions around and associated with each BS in the network capable of being used as a reference BS;
   for each of the one or more regions,
      compiling a statistical database of previously reported PN phase offsets from MSs whose locations are estimated to be within the region and that utilize the BS associated with the region as their reference BS, wherein the compiled statistical database is determined to contain one or more peaks, each peak resulting from a compilation of previously reported and similarly timed PN phase offsets,
      identifying one or more groups of peaks from within the compiled statistical database for the region, each identified group of peaks corresponding to the previously reported PN phase offsets of the pilot signals transmitted by a specific non-reference BS, and
      for each identified group of peaks, selecting one of the peaks as representing the optimal path PN phase offset for the specific non-reference BS associated with that group of peaks, and selecting one or more of the peaks as representing the one or more improved path PN phase offsets for the specific non-reference BS associated with that group of peaks;
   estimating a location of the MS using PN phase offsets previously reported by the MS;
   identifying the compiled statistical database corresponding to the region encompassing the estimated location of the MS;
   identifying the group of peaks from within the identified compiled statistical database corresponding to the non-reference BS associated with the first PN phase offset; and
   predicting whether the first PN phase offset is the optimal path PN phase offset by determining whether the first PN phase offset favorably compares to the peak representing the optimal path PN phase offset from within the identified group of peaks.

22. The PDE as recited in claim 21, the PDE processor further programmed for providing the MS with information for locating the one or more improved path PN phase offsets by:
   calculating one or more time differences between the first PN phase offset and the one or more improved path PN phase offsets within the identified group of peaks; and
   providing the MS with the one or more time differences to assist the MS in locating and measuring the one or more improved path PN phase offsets.

23. The PDE as recited in claim 21, the PDE processor further programmed for providing the MS with information for locating the one or more improved path PN phase offsets by:
   calculating one or more time differences between a reference PN phase offset from the reference BS and the one or more improved path PN phase offsets within the identified group of peaks; and
   providing the MS with the one or more time differences to assist the MS in locating and measuring the one or more improved path PN phase offsets.

24. The PDE as recited in claim 21, the PDE processor further programmed for:
   receiving a second PN phase offset of a pilot signal received at the MS from a non-refrence BS in a second PPM if the PDE provided the MS with the information for locating the one or more improved path PN phase offsets; and
   predicting whether the second PN phase offset corresponds to one of the improved path PN phase offsets by determining whether the second PN phase offset favorably compares to one of the peaks representing one of the improved path PN phase offsets from within the identified group of peaks.

25. The PDE as recited in claim 21, wherein if the first PN phase offset is predicted to be the optimal path PN phase offset, the PDE processor is further programmed for utilizing the first PN phase offset in Advanced Forward Link Trilateration (AFLT) position location calculations to assist in determining the location of the MS.

26. The PDE as recited in claim 24, wherein if the second PN phase offset is predicted to be one of the improved path PN phase offsets, the PDE processor is further programmed for utilizing the second PN phase offset in Advanced Forward Link Trilateration (AFLT) position location calculations to assist in determining a location of the MS.

27. The PDE as recited in claim 21, wherein for each identified group of peaks in each of the one or more regions, the PDE processor is further programmed for identifying an earliest arriving peak as representing the optimal path PN phase offset for the specific non-reference BS associated with that group of peaks.

28. The PDE as recited in claim 21, wherein for each identified group of peaks in each of the one or more regions, the PDE processor is further programmed for identifying an earliest arriving peak having an amplitude above a predetermined threshold as representing the optimal path PN phase offset for the specific non-reference BS associated with that group of peaks.

29. The PDE as recited in claim 21, wherein for each identified group of peaks in each of the one or more regions, the PDE processor is further programmed for identifying those peaks having an earlier arrival time than the first PN phase offset as representing the one or more improved path PN phase offsets for the specific non-reference BS associated with that group of peaks.

30. The PDE as recited in claim 29, the PDE processor further programmed for providing the MS with information for locating the one or more improved path PN phase offsets by:
calculating one or more time differences between the first PN phase offset and the one or more improved path PN phase offsets within the identified group of peaks; and
providing the MS with a prioritized sequence of the one or more time differences to assist the MS in locating and measuring the one or more improved path PN phase offsets.

31. The PDE as recited in claim 21, the PDE processor further programmed for:
including an amplitude value in the compiled statistical database for each of the one or more peaks in each of the one or more regions; and
identifying those peaks having an earlier arrival time than the first PN phase offset and having an amplitude value above a predetermined threshold as representing the one or more improved path PN phase offsets for the specific non-reference BS associated with that group of peaks.

32. The method as recited in claim 31, each amplitude value representing a frequency of occurrence of the PN phase offsets associated with each peak.

33. The method as recited in claim 31, each amplitude value representing an average pilot energy of the PN phase offsets associated with each peak.

34. The method as recited in claim 31, each amplitude value representing an combination of a frequency of occurrence and an average pilot energy of the PN phase offsets associated with each peak.

35. The PDE as recited in claim 31, the PDE processor further programmed for providing the MS with information for locating the one or more improved path PN phase offsets by:
calculating one or more time differences between the first PN phase offset and the one or more improved path PN phase offsets;
creating a prioritized sequence of the one or more time differences for the one or more improved path PN phase offsets in descending order according to the amplitude value of the peak associated with each improved path PN phase offset; and
providing the MS with the prioritized sequence of the one or more time differences to assist the MS in locating and measuring the one or more improved path PN phase offsets.

36. The PDE as recited in claim 21, the PDE processor further programmed for defining the one or more regions around each BS such that any MSs within the same region that utilize the BS associated with the region as their reference BS will report similar PN phase offsets, while any two MSs in different regions that utilize the BS associated with the region as their reference BS will report different PN phase offsets.

37. The PDE as recited in claim 21, wherein the statistical database is compiled using a predetermined number of most recently reported PN phase measurements.

* * * * *